US012809596B2

(12) United States Patent
Kunz

(10) Patent No.: US 12,809,596 B2
(45) Date of Patent: Nov. 24, 2026

(54) LANGUAGE SERVER BASED CONTEXT PROVISIONING FOR CODE GENERATION WITH LARGE LANGUAGE MODELS

(71) Applicant: SAP SE, Walldorf (DE)

(72) Inventor: David Kunz, Wilhelmsfeld (DE)

(73) Assignee: SAP SE, Walldorf (DE)

( * ) Notice: Subject to any disclaimer, the term of this patent is extended or adjusted under 35 U.S.C. 154(b) by 295 days.

(21) Appl. No.: 18/439,508

(22) Filed: Feb. 12, 2024

(65) Prior Publication Data

US 2025/0258659 A1 Aug. 14, 2025

(51) Int. Cl.
*G06F 8/35* (2018.01)
*G06F 40/20* (2020.01)

(52) U.S. Cl.
CPC ................ *G06F 8/35* (2013.01); *G06F 40/20* (2020.01)

(58) Field of Classification Search
CPC .................................... G06F 8/35; G06F 40/20
See application file for complete search history.

(56) References Cited

U.S. PATENT DOCUMENTS

| | | | | |
|---|---|---|---|---|
| 11,461,081 | B2 * | 10/2022 | Zhang | G06F 16/00 |
| 12,346,690 | B2 * | 7/2025 | Qiao | G06F 8/73 |
| 2020/0097261 | A1 * | 3/2020 | Smith | G06F 8/33 |
| 2024/0111498 | A1 * | 4/2024 | Vaughn | G06F 8/30 |
| 2024/0403005 | A1 * | 12/2024 | Friddle | G06F 8/35 |
| 2025/0094138 | A1 * | 3/2025 | Hu | G06F 40/226 |
| 2025/0110709 | A1 * | 4/2025 | Odibat | G06F 8/35 |
| 2025/0117195 | A1 * | 4/2025 | Rieken | G06F 8/33 |
| 2025/0130775 | A1 * | 4/2025 | Gaddam | G06F 8/20 |
| 2025/0258754 | A1 * | 8/2025 | Sharma | G06F 8/30 |

FOREIGN PATENT DOCUMENTS

| | | |
|---|---|---|
| JP | 2017520842 | 7/2017 |
| WO | 2023172817 | 9/2023 |

OTHER PUBLICATIONS

"European Application No. 24206831.0 Extended European Search Report mailed on Apr. 1, 2025", 12 pgs.
Shrivastava, Disha, "Repository-Level Prompt Generation for Large Models of Code", ICML, 2023, 18 pgs.
"European Application Serial No. 24206831.0, Communication Pursuant to Article 943 EPC mailed Apr. 24, 2026", 14 pgs.
"Japanese Application Serial No. 2024-201507, Notice of Reasons for Refusal mailed Aug. 25, 2026", w English Translation, 6 pgs.

* cited by examiner

*Primary Examiner* — Douglas M Slachta
(74) *Attorney, Agent, or Firm* — SCHWEGMAN LUNDBERG & WOESSNER, P.A.

(57) ABSTRACT

In an example embodiment, a language server connected to an integrated Development Environment (IDE) is used to identify, from a given input code, various code artifacts, such as functions, variables, etc., and then to search a repository of code files for declarations, definitions, and references related to those identified code artifacts. The declarations, definitions, and references can then be passed as context into an LLM.

20 Claims, 4 Drawing Sheets

LANGUAGE SERVER BASED CONTEXT PROVISIONING FOR CODE GENERATION WITH LARGE LANGUAGE MODELS

TECHNICAL FIELD

This document generally relates to computer systems. More specifically, this document relates to use of large language models.

BACKGROUND

A large language model (LLM) refers to an artificial intelligence (AI) system that has been trained on an extensive dataset to understand and generate human language. These models are designed to process and comprehend natural language in a way that allows them to answer questions, engage in conversations, generate text, and perform various language-related tasks.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
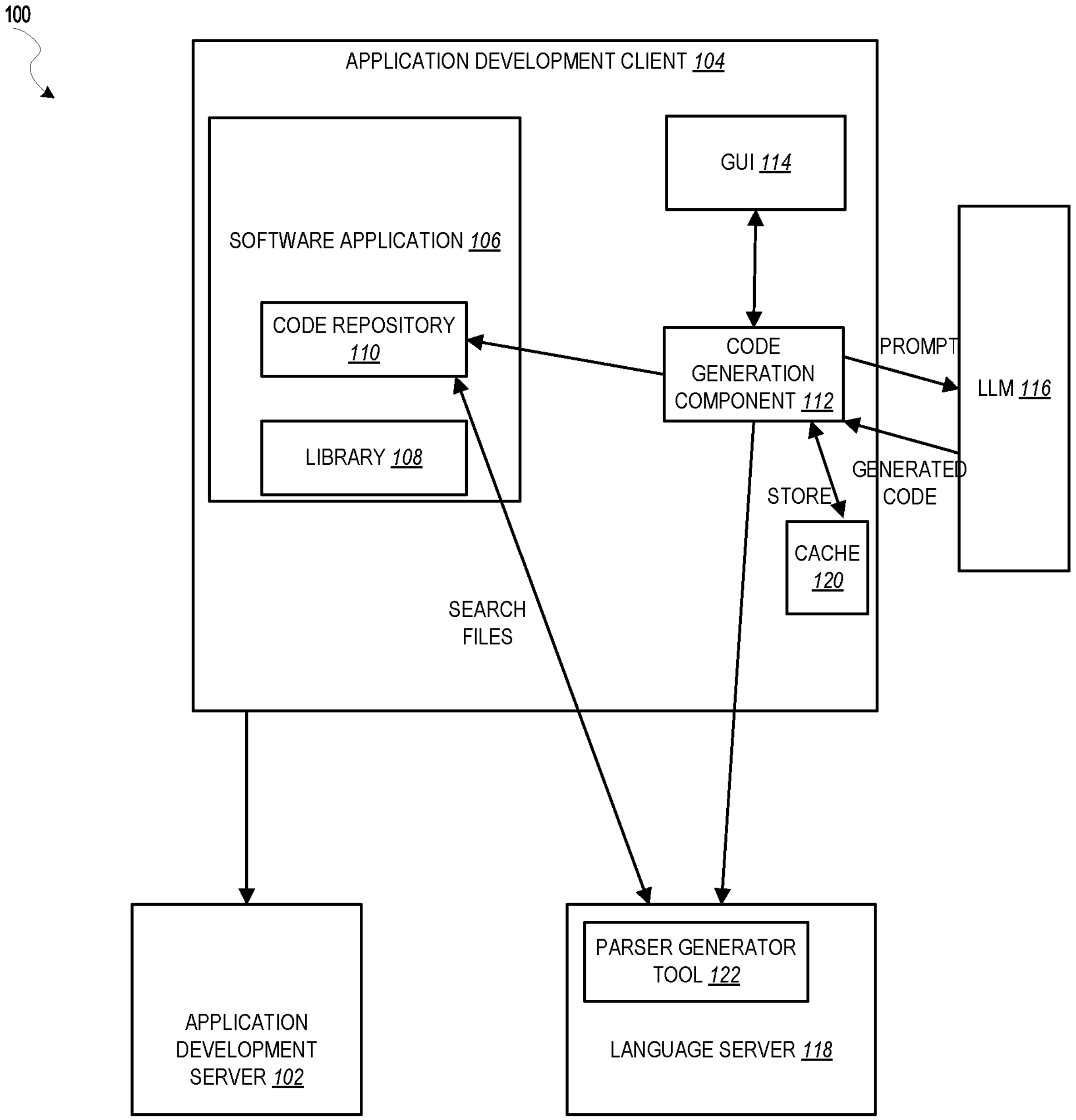
FIG. 1 is a block diagram illustrating a system for automatically generating computer code, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

LLMs are highly capable of generating text and even computer code (to be compiled into running software). LLMs, however, are limited due to the fact that their existing knowledge is limited by their training data. The result is that the output is not always correct. There are ways to reduce the impact of this limitation, such as by crafting appropriate system messages, adding external data through generated function invocations, or fine-tuning the foundation models, but these solutions are not perfect and still result in erroneous output. These limitations are amplified when the LLM is outputting compilable computer code, where it is not only important that the substance of the output be correct but also that the syntax and formatting be correct.

Indeed, certain types of compilable computer code may be even more difficult for an LLM to generate correctly, due to a number of factors, such as the compilable computer code type being one that is proprietary or at least partially proprietary (and thus in a format that is difficult to train an LLM on), and the compilable computer code type being one that is difficult to change once it is generated.

One of the biggest technical challenges involved in using LLMs for code generation is providing the correct context. LLMs operate better when they are not just provided with bare requests for generation (e.g., "generate me some code to do X") but are also provided with some contextual information, such as the location of the code in which the newly generated code is to be placed, related files with important definitions, etc. The more context the LLM has for a request, the better the reliability of code generation will be. If one were to hypothetically provide every code snippet in an entire application's worth of code to the LLM, then the resultant code generated would be very reliable.

The problem is that LLMs typically have a limit on how much context is able to be provided with a request (e.g., a maximum number of input tokens), and even in cases where such limits do not exist or where the limits are not quite reached, adding additional context adds to inference costs (either in money or in speed, for example). Thus, while it is important to provide relevant context for a request to an LLM, it is also important not to provide irrelevant context. Identifying relevant context, however, can be technically challenging.

One solution would be to identify all open files and then send the closest (e.g., using Jaccard distance) snippets of all open files with the current surrounding code. This method, however, would fail if relevant files are not open.

In an example embodiment, a language server connected to an integrated Development Environment (IDE) is used to identify, from a given input code, various code artifacts, such as functions, variables, etc., and then to search a repository of code files for declarations, definitions, and references related to those identified code artifacts. The declarations, definitions, and references can then be passed as context into the LLM.

LLMs used to generate information are generally referred to as Generative Artificial Intelligence (GAI) models. A GAI model may be implemented as a generative pre-trained transformer (GPT) model or a bidirectional encoder. A GPT model is a type of machine learning model that uses a transformer architecture, which is a type of deep neural network that excels at processing sequential data, such as natural language.

A bidirectional encoder is a type of neural network architecture in which the input sequence is processed in two directions: forward and backward. The forward direction starts at the beginning of the sequence and processes the input one token at a time, while the backward direction starts at the end of the sequence and processes the input in reverse order.

By processing the input sequence in both directions, bidirectional encoders can capture more contextual information and dependencies between words, leading to better performance.

The bidirectional encoder may be implemented as a Bidirectional Long Short-Term Memory (BiLSTM) or BERT (Bidirectional Encoder Representations from Transformers) model.

Each direction has its own hidden state, and the final output is a combination of the two hidden states.

Long Short-Term Memories (LSTMs) are a type of recurrent neural network (RNN) that are designed to overcome the vanishing gradient problem in traditional RNNs, which can make it difficult to learn long-term dependencies in sequential data.

LSTMs include a cell state, which serves as a memory that stores information over time. The cell state is controlled by three gates: the input gate, the forget gate, and the output gate. The input gate determines how much new information is added to the cell state, while the forget gate decides how much old information is discarded. The output gate determines how much of the cell state is used to compute the output. Each gate is controlled by a sigmoid activation function, which outputs a value between 0 and 1 that determines the amount of information that passes through the gate.

In BiLSTM, there is a separate LSTM for the forward direction and the backward direction. At each time step, the forward and backward LSTM cells receive the current input token and the hidden state from the previous time step. The forward LSTM processes the input tokens from left to right, while the backward LSTM processes them from right to left.

The output of each LSTM cell at each time step is a combination of the input token and the previous hidden state, which allows the model to capture both short-term and long-term dependencies between the input tokens.

BERT applies bidirectional training of a model known as a transformer to language modeling. This is in contrast to prior art solutions that looked at a text sequence either from left to right or combined left to right and right to left. A bidirectionally trained language model has a deeper sense of language context and flow than single-direction language models.

More specifically, the transformer encoder reads the entire sequence of information, and thus is considered to be bidirectional (although one could argue that it is, in reality, non-directional). This characteristic allows the model to learn the context of a piece of information based on all of its surroundings.

In other example embodiments, a generative adversarial network (GAN) embodiment may be used. GAN is a supervised machine learning model that has two sub-models: a generator model that is trained to generate new examples, and a discriminator model that tries to classify examples as either real or generated. The two models are trained together in an adversarial manner (using a zero-sum game according to game theory), until the discriminator model is fooled roughly half the time, which means that the generator model is generating plausible examples.

The generator model takes a fixed-length random vector as input and generates a sample in the domain in question. The vector is drawn randomly from a Gaussian distribution, and the vector is used to seed the generative process. After training, points in this multidimensional vector space will correspond to points in the problem domain, forming a compressed representation of the data distribution. This vector space is referred to as a latent space, or a vector space comprised of latent variables. Latent variables, or hidden variables, are those variables that are important for a domain but are not directly observable.

The discriminator model takes an example from the domain as input (real or generated) and predicts a binary class label of real or fake (generated).

Generative modeling is an unsupervised learning problem, though a clever property of the GAN architecture is that the training of the generative model is framed as a supervised learning problem.

The two models, the generator and discriminator, are trained together. The generator generates a batch of samples, and these, along with real examples from the domain, are provided to the discriminator and classified as real or fake.

The discriminator is then updated to get better at discriminating real and fake samples in the next round, and importantly, the generator is updated based on how well, or not, the generated samples fooled the discriminator.

In another example embodiment, the GAI model is a Variational AutoEncoders (VAEs) model. VAEs comprise an encoder network that compresses the input data into a lower-dimensional representation, called a latent code, and a decoder network that generates new data from the latent code. In either case, the GAI model contains a generative classifier, which can be implemented as, for example, a naïve Bayes classifier.

The present solution works with any type of GAI model, although an implementation that specifically is used with a GPT model will be described.

FIG. 1 is a block diagram illustrating a system 100 for automatically generating software programming code, in accordance with an example embodiment. Here, an application development server 102 provides a server allowing one or more clients, such as application development client 104, to create and manage computer code. In some example embodiments, the computer code is generated for use in a data model infrastructure such as Core Data Services (CDS) from SAP SE of Walldorf, Germany. CDS enables service definitions and data models to be declaratively captured in plain object notations. CDS models are typically written in CDS language and then compiled.

The application development client 104 is generally used to control application development server 102 to create an application using a first programming language, and the application development client 104 may be where the user creates a software application 106 (although in such cases it would commonly also be stored at the application development server 102 as a backup and/or to allow other users to edit it). This aspect is not intended to be limiting, however, and in some example embodiments, the software application 106 is created exclusively on the application development server 102. The software application 106 is essentially in programming language form until it is compiled or interpreted, may generally include a library 108 including programming language-specific files. For example, if the user wishes to use to application development client 104 to create an application in JavaScript, the programming language-specific files are JavaScript libraries.

Code created for the software application 106 may be stored in a code repository 110. This may include, for example, code written by a software developer and/or code that is generated by an LLM 116. When the software application 106 is compiled, this basically means that the files in the code repository 110 and the library 108 are compiled.

A code generation component 112 manages the generation of code by the LLM 116. More specifically, when prompted to generate code (such as by a request delivered from a graphical user interface 114), the code generation component 112 identifies the file currently being edited by the user (and optionally contextual information about the editing). For example, the user may be editing "file1.js" and the user's cursor may be in a specific location within the code of file1.js. The code generation component 112 may receive this information from the GUI 114. This information may then be passed to the language server 118, which then parses the file the user is currently editing to identify artifacts. For purposes of this disclosure, artifacts are distinctly delineated snippets of code. This may include, for example, functions, routines, subroutines, variables, constants, etc.

In some example embodiments, the language server 118 identifies all artifacts in the entire file that the user is currently editing. In other example embodiments, the language server 118 may utilize context information, such as the location of the user's cursor, to identify only those artifacts that are relevant to the portion of the file that the user is currently editing.

The language server 118 returns a list of relevant artifacts to the code generation component 112. The code generation component 112 then requests that the language server 118 locate code snippets in the code repository 110 that are relevant to the artifacts in the list of relevant artifacts. The language server 118 then searches the code repository 110, looking for such relevant code snippets, such as by identifying the file and location with the file where each artifact is declared, defined, or referenced. This includes searching through closed files (files not currently opened by the user).

The identifies files and locations are then passed back to the code generation component 112, which generates a request for code generation to the LLM 116 and includes the contents of the identified files and locations, as well as the metadata (e.g., location), as context for that code generation request. The LLM 116 then uses this context to generate code, which is returned to the code generation component 112 and eventually stored in the code repository 110.

The result is that the LLM 116 generates more relevant computer code, due to the presence of the relevant context with the code generation request.

In some example embodiments, this process may be repeated in an iterative fashion. Specifically, whenever relevant code snippets are found for a particular artifact, it is possible that that relevant code will have artifacts of its own that would benefit from context. Thus, for example, a function "foo" may be referenced in a file "file1.js" being edited by the user. A first iteration may retrieve all code snippets from other files where "foo" was declared, defined, or referenced, but it may be that, for example, "file2.js" contains a definition for foo that references a variable "var1" that is not defined in either file1.js or file2.js. Thus, a subsequent iteration would allow the language server to identify code snippets relevant to "var1" (as well as other undefined artifacts found in the prior iteration). This iterative process can be repeated until some condition is met. In some example embodiments, this interactive process may stop at some predefined maximum number of iterations (e.g., 10 iterations) in order to prevent an overwhelming amount of contextual information for the LLM to handle.

In an example embodiment, the identified files and locations may be stored in a cache 120. This improves performance of the overall system 100 because it allows the code generation component 112 to retrieve identified files and locations from the cache 120 without needing to use the language server 118 to search the entire code repository 110 on subsequent requests for code for the same edited file.

In an example embodiment, the language server 118 may utilize a parser generator tool 122 to parse the computer code in which it is trying to identify artifacts (e.g., the current file or snippet being edited by the user). The parser generator tool 122 may represent the computer code as an abstract syntax tree, which is a more structured way of representing artifacts in source code than the plain text.

Figure 2:
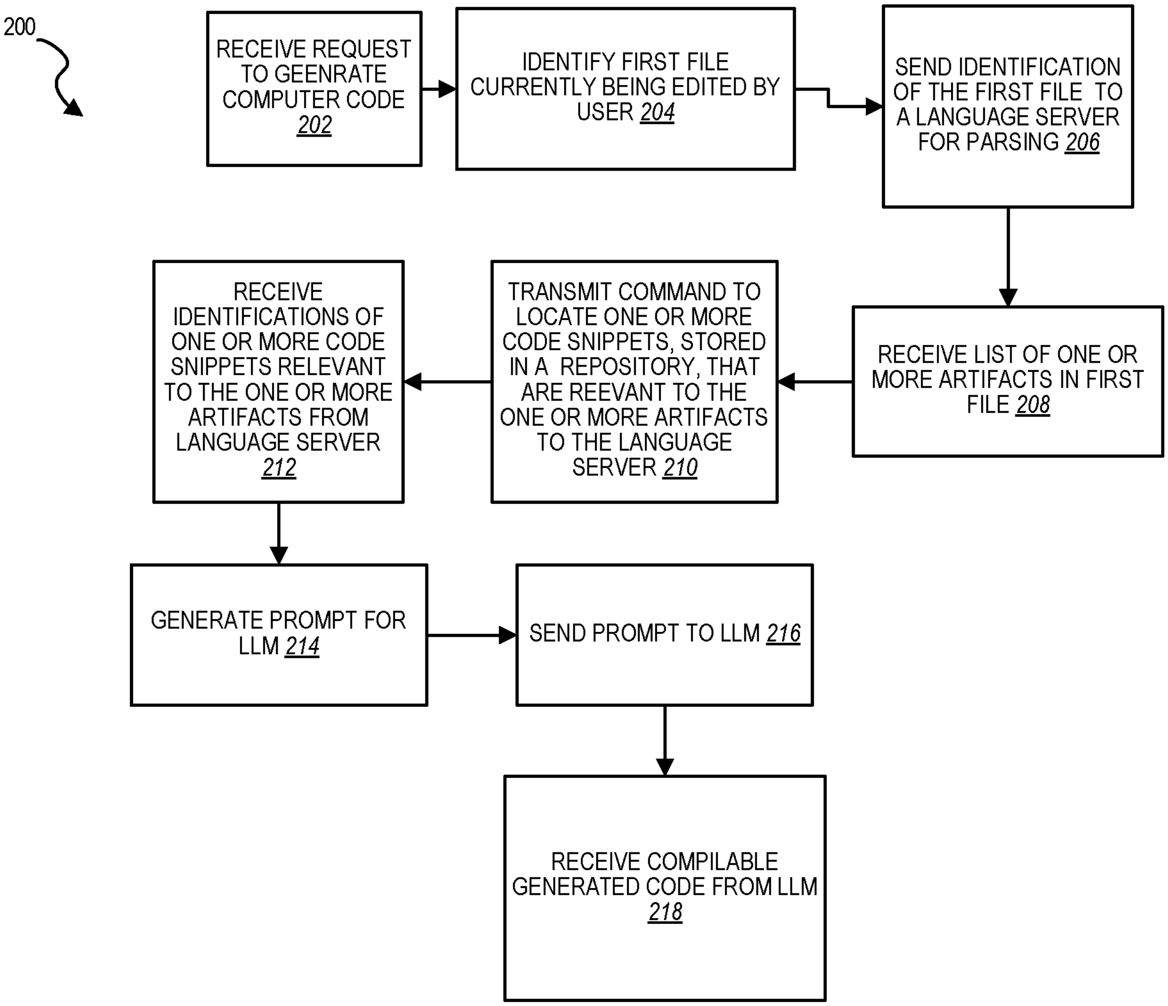
FIG. 2 is a flow diagram illustrating a method for automatically generating computer code, in accordance with an example embodiment.

FIG. 2 is a flow diagram illustrating a method 200 for generating computer code, in accordance with an example embodiment. At operation 202, a request to generate computer code on behalf of a user is received. This request may be received from a graphical user interface operated by the user, such as a graphical user interface that is part of an application development environment and is used by the user to write and edit computer code. In some example embodiments, the request may be generated based on some explicit action by the user (e.g., the user specifying that the user wants computer code to be automatically generated). In other example embodiments, the request may be generated without such an explicit action, such as by inferring that the user would want code automatically generated. At operation 204, in response to the receiving, a first file currently being edited by the user is identified. In some example embodiments, this identifying operations additionally includes identifying contextual information about the editing of the first file, like the location of a cursor within the first file, as displayed in the graphical user interface.

At operation 206, an identification of the first file is transmitted to a language server to cause the parsing of the first file to identify one or more artifacts in the first file are transmitted to a language server. At operation 208, a list of identified one or more artifacts is received from the language server. At operation 210, a command to locate one or more code snippets, stored in a code repository, that are relevant to the identified one or more artifacts, is transmitted to the language server. In some example embodiments, this operation may also include sending the contextual information about the editing of the first file as well. At operation 212, identifications of the one or more code snippets that are relevant to the identified one or more artifacts are received from the language server. In embodiments where the contextual information about the editing of the first file is sent to the language server, then these identifications may include only identifications of one or more code snippets that are relevant to the identified one or more artifacts based on the contextual information (such as those only relevant to the artifacts in proximity to the user's cursor as opposed to all artifacts in the first file).

At operation 214, a prompt to a large language model (LLM) is generated. The prompt includes instructions to generate code based on using the identified one or more artifacts as context. At operation 216, the prompt is sent to the LLM. At operation 218, compilable generated code is received from the LLM.

In view of the disclosure above, various examples are set forth below. It should be noted that one or more features of an example, taken in isolation or combination, should be considered within the disclosure of this application.

Example 1 is a system comprising: at least one hardware processor; and a non-tangible computer-readable medium storing instructions that, when executed by the at least one hardware processor, cause the at least one hardware processor to perform operations comprising: receiving a request to generate computer code on behalf of a user; in response to the receiving, identifying a first file currently being edited by the user; transmitting, to a language server, an identification of the first file along with a command to parse the first file to identify one or more artifacts in the first file; receiving, from the language server, a list of identified one or more artifacts; transmitting, to the language server, a command to locate one or more code snippets, stored in a code repository, that are relevant to the identified one or more artifacts; receiving, from the language server, identifications of the one or more code snippets that are relevant to the identified one or more artifacts; generating a prompt to a large language model (LLM), the prompt including instructions to generate code based on using the identified one or more artifacts as context; sending the prompt to the LLM; receiving compilable generated code from the LLM.

In Example 2, the subject matter of Example 1 includes, wherein the receiving a request includes receiving a directive from a graphical user interface currently being interacted with by the user, the directive generated based on an explicit request from the user.

In Example 3, the subject matter of Examples 1-2 includes, wherein the receiving a request includes receiving a directive from a graphical user interface currently being interacted with by the user, the directive generated without an explicit request from the user.

In Example 4, the subject matter of Examples 1-3 includes, wherein the operations further comprise, in response to the receiving of the request: identifying contextual information about the editing of the first file; and wherein the transmitting, to the language server, an identification further includes transmitting, to the language server, the contextual information about the editing of the first file.

In Example 5, the subject matter of Example 4 includes, wherein the contextual information includes a location of a cursor within the first file, as displayed a graphical user interface operated by the user.

In Example 6, the subject matter of Examples 4-5 includes, wherein the identifications of the one or more code snippets that are relevant to the identified one or more artifacts are limited to identifications only of code snippets that are relevant based on the contextual information.

In Example 7, the subject matter of Examples 1-6 includes, wherein at least one of the one or more code snippets are contained in a file that is currently closed.

Example 8 is a method comprising: receiving a request to generate computer code on behalf of a user; in response to the receiving, identifying a first file currently being edited by the user; transmitting, to a language server, an identification of the first file along with a command to parse the first file to identify one or more artifacts in the first file; receiving, from the language server, a list of identified one or more artifacts; transmitting, to the language server, a command to locate one or more code snippets, stored in a code repository, that are relevant to the identified one or more artifacts; receiving, from the language server, identifications of the one or more code snippets that are relevant to the identified one or more artifacts; generating a prompt to a large language model (LLM), the prompt including instructions to generate code based on using the identified one or more artifacts as context; sending the prompt to the LLM; receiving generated code from the LLM.

In Example 9, the subject matter of Example 8 includes, wherein the receiving a request includes receiving a directive from a graphical user interface currently being interacted with by the user, the directive generated based on an explicit request from the user.

In Example 10, the subject matter of Examples 8-9 includes, wherein the receiving a request includes receiving a command from a graphical user interface currently being interacted with by the user, the command generated without an explicit request from the user.

In Example 11, the subject matter of Examples 8-10 includes, in response to the receiving of the request: identifying contextual information about the editing of the first file; and wherein the transmitting, to the language server, an identification further includes transmitting, to the language server, the contextual information about the editing of the first file.

In Example 12, the subject matter of Example 11 includes, wherein the contextual information includes a location of a cursor within the first file, as displayed a graphical user interface operated by the user.

In Example 13, the subject matter of Example 12 includes, wherein the identifications of the one or more code snippets that are relevant to the identified one or more artifacts are limited to identifications only of code snippets that are relevant based on the contextual information.

In Example 14, the subject matter of Examples 8-13 includes, wherein at least one of the one or more code snippets are contained in a file that is currently closed.

Example 15 is a non-transitory machine-readable medium storing instructions which, when executed by one or more processors, cause the one or more processors to perform operations comprising: receiving a request to generate computer code on behalf of a user; in response to the receiving, identifying a first file currently being edited by the user; transmitting, to a language server, an identification of the first file along with a command to parse the first file to identify one or more artifacts in the first file; receiving, from the language server, a list of identified one or more artifacts; transmitting, to the language server, a command to locate one or more code snippets, stored in a code repository, that are relevant to the identified one or more artifacts; receiving, from the language server, identifications of the one or more code snippets that are relevant to the identified one or more artifacts; generating a prompt to a large language model (LLM), the prompt including instructions to generate code based on using the identified one or more artifacts as context; sending the prompt to the LLM; and receiving compilable generated code from the LLM.

In Example 16, the subject matter of Example 15 includes, wherein the receiving a request includes receiving a directive from a graphical user interface currently being interacted with by the user, the directive generated based on an explicit request from the user.

In Example 17, the subject matter of Examples 15-16 includes, wherein the receiving a request includes receiving a command from a graphical user interface currently being interacted with by the user, the command generated without an explicit request from the user.

In Example 18, the subject matter of Examples 15-17 includes, wherein the operations further comprise, in response to the receiving of the request: identifying contextual information about the editing of the first file; and wherein the transmitting, to the language server, an identification further includes transmitting, to the language server, the contextual information about the editing of the first file.

In Example 19, the subject matter of Example 18 includes, wherein the contextual information includes a location of a cursor within the first file, as displayed a graphical user interface operated by the user.

In Example 20, the subject matter of Example 19 includes, wherein the identifications of the one or more code snippets that are relevant to the identified one or more artifacts are limited to identifications only of code snippets that are relevant based on the contextual information.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Figure 3:
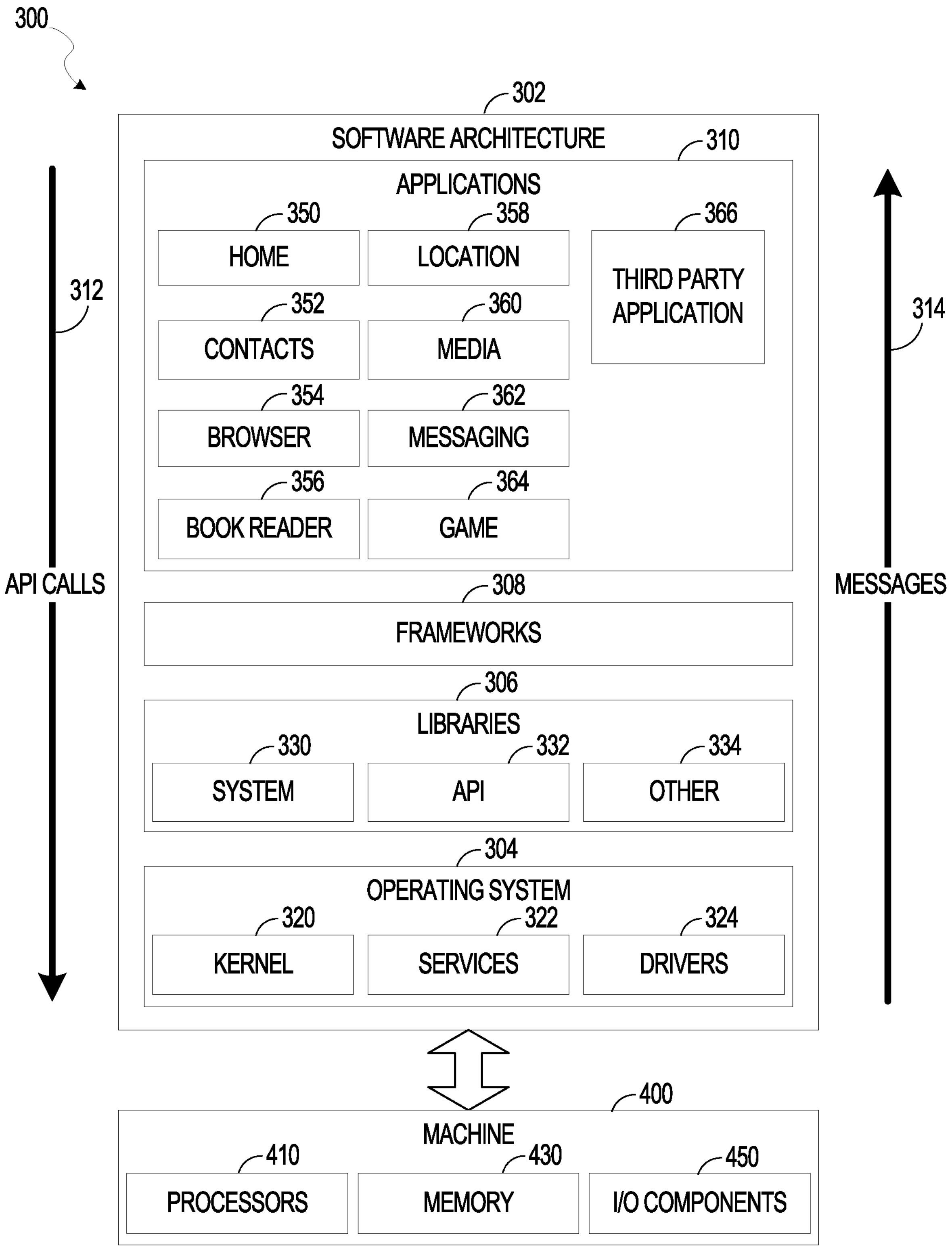
FIG. 3 is a block diagram illustrating an architecture of software, which can be installed on any one or more of the devices described above.

FIG. 3 is a block diagram 300 illustrating a software architecture 302, which can be installed on any one or more of the devices described above. FIG. 3 is merely a non-limiting example of a software architecture, and it will be appreciated that many other architectures can be implemented to facilitate the functionality described herein. In various embodiments, the software architecture 302 is implemented by hardware such as a machine 400 of FIG. 4 that includes processors 410, memory 430, and input/output (I/O) components 450. In this example architecture, the software architecture 302 can be conceptualized as a stack of layers where each layer may provide a particular functionality. For example, the software architecture 302 includes layers such as an operating system 304, libraries 306, frameworks 308, and applications 310. Operationally, the applications 310 invoke API calls 312 through the software stack and receive messages 314 in response to the API calls 312, consistent with some embodiments.

In various implementations, the operating system 304 manages hardware resources and provides common services. The operating system 304 includes, for example, a kernel 320, services 322, and drivers 324. The kernel 320 acts as an abstraction layer between the hardware and the other software layers, consistent with some embodiments. For example, the kernel 320 provides memory management, processor management (e.g., scheduling), component management, networking, and security settings, among other functionalities. The services 322 can provide other common services for the other software layers. The drivers 324 are responsible for controlling or interfacing with the underlying hardware, according to some embodiments. For instance, the drivers 324 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 306 provide a low-level common infrastructure utilized by the applications 310. The libraries 306 can include system libraries 330 (e.g., C standard library) that can provide functions such as memory allocation functions, string manipulation functions, mathematic functions, and the like. In addition, the libraries 306 can include API libraries 332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 306 can also include a wide variety of other libraries 334 to provide many other APIs to the applications 310.

The frameworks 308 provide a high-level common infrastructure that can be utilized by the applications 310, according to some embodiments. For example, the frameworks 308 provide various GUI functions, high-level resource management, high-level location services, and so forth. The frameworks 308 can provide a broad spectrum of other APIs that can be utilized by the applications 310, some of which may be specific to a particular operating system 304 or platform.

In an example embodiment, the applications 310 include a home application 350, a contacts application 352, a browser application 354, a book reader application 356, a location application 358, a media application 360, a messaging application 362, a game application 364, and a broad assortment of other applications, such as a third-party application 366. According to some embodiments, the applications 310 are programs that execute functions defined in the programs. Various programming languages can be employed to create one or more of the applications 310, structured in a variety of manners, such as object-oriented programming languages (e.g., Objective-C, Java, or C++) or procedural programming languages (e.g., C or assembly language). In a specific example, the third-party application 366 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 366 can invoke the API calls 312 provided by the operating system 304 to facilitate functionality described herein.

Figure 4:
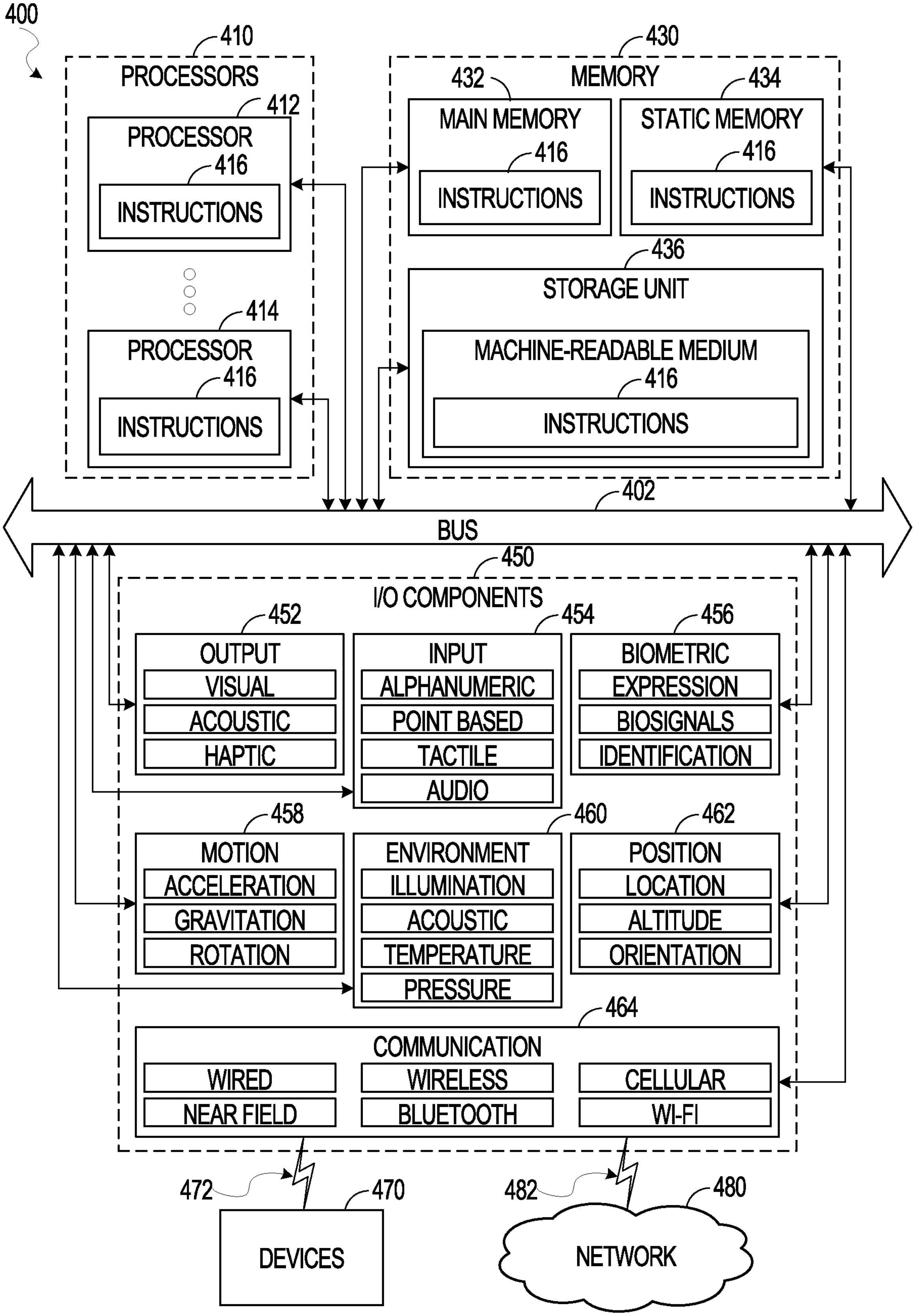
FIG. 4 illustrates a diagrammatic representation of a machine in the form of a computer system within which a set of instructions may be executed for causing the machine to perform any one or more of the methodologies discussed herein, according to an example embodiment.

FIG. 4 illustrates a diagrammatic representation of a machine 400 in the form of a computer system within which a set of instructions may be executed for causing the machine 400 to perform any one or more of the methodologies discussed herein, according to an example embodiment. Specifically, FIG. 4 shows a diagrammatic representation of the machine 400 in the example form of a computer system, within which instructions 416 (e.g., software, a program, an application, an applet, an app, or other executable code) for causing the machine 400 to perform any one or more of the methodologies discussed herein may be executed. For example, the instructions 416 may cause the machine 400 to execute the method 200 of FIG. 2. Additionally, or alternatively, the instructions 416 may implement FIGS. 1-2 and so forth. The instructions 416 transform the general, non-programmed machine 400 into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 416, sequentially or otherwise, that specify actions to be taken by the machine 400. Further, while only a single machine 400 is illustrated, the term "machine" shall also be taken to include a collection of machines 400 that individually or jointly execute the instructions 416 to perform any one or more of the methodologies discussed herein.

The machine 400 may include processors 410, memory 430, and I/O components 450, which may be configured to communicate with each other such as via a bus 402. In an example embodiment, the processors 410 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 412 and a processor 414 that may execute the instructions 416. The term "processor" is intended to include multi-core processors that may comprise two or more independent processors (sometimes referred to as "cores") that may execute instructions 416 contemporaneously. Although FIG. 4 shows multiple processors 410, the machine 400 may include a single processor 412 with a single core, a single processor 412 with multiple cores (e.g., a multi-core processor 412), multiple processors 412, 414 with a single core, multiple processors 412, 414 with multiple cores, or any combination thereof.

The memory 430 may include a main memory 432, a static memory 434, and a storage unit 436, each accessible to the processors 410 such as via the bus 402. The main memory 432, the static memory 434, and the storage unit 436 store the instructions 416 embodying any one or more of the methodologies or functions described herein. The instructions 416 may also reside, completely or partially, within the main memory 432, within the static memory 434, within the storage unit 436, within at least one of the processors 410 (e.g., within the processor's cache memory), or any suitable combination thereof, during execution thereof by the machine 400.

The I/O components 450 may include a wide variety of components to receive input, provide output, produce output, transmit information, exchange information, capture measurements, and so on. The specific I/O components 450 that are included in a particular machine will depend on the type of machine. For example, portable machines such as mobile phones will likely include a touch input device or other such input mechanisms, while a headless server machine will likely not include such a touch input device. It will be appreciated that the I/O components 450 may include many other components that are not shown in FIG. 4. The I/O components 450 are grouped according to functionality merely for simplifying the following discussion, and the grouping is in no way limiting. In various example embodiments, the I/O components 450 may include output components 452 and input components 454. The output components 452 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 450 may include biometric components 456, motion components 458, environmental components 460, or position components 462, among a wide array of other components. For example, the biometric components 456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 458 may include acceleration sensor components (e.g., accelerometer), gravitation sensor components, rotation sensor components (e.g., gyroscope), and so forth. The environmental components 460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 462 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 450 may include communication components 464 operable to couple the machine 400 to a network 480 or devices 470 via a coupling 482 and a coupling 472, respectively. For example, the communication components 464 may include a network interface component or another suitable device to interface with the network 480. In further examples, the communication components 464 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 470 may be another machine or any of a wide variety of peripheral devices (e.g., coupled via a USB).

Moreover, the communication components 464 may detect identifiers or include components operable to detect identifiers. For example, the communication components 464 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 464, such as location via Internet Protocol (IP) geolocation, location via Wi-Fi® signal triangulation, location via detecting an NFC beacon signal that may indicate a particular location, and so forth.

The various memories (e.g., 430, 432, 434, and/or memory of the processor(s) 410) and/or the storage unit 436 may store one or more sets of instructions 416 and data structures (e.g., software) embodying or utilized by any one or more of the methodologies or functions described herein. These instructions (e.g., the instructions 416), when executed by the processor(s) 410, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 480 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 480 or a portion of the network 480 may include a wireless or cellular network, and the coupling 482 may be a Code Division Multiple Access (CDMA) connection, a Global System for Mobile communications (GSM) connection, or another type of cellular or wireless coupling. In this example, the coupling 482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 416 may be transmitted or received over the network 480 using a transmission medium via a network interface device (e.g., a network interface component included in the communication components 464) and utilizing any one of a number of well-known transfer protocols (e.g., HTTP). Similarly, the instructions 416 may be transmitted or received using a transmission medium via the coupling 472 (e.g., a peer-to-peer coupling) to the devices 470. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 416 for execution by the machine 400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:

at least one hardware processor; and a non-transitory computer-readable medium storing instructions that, when executed by the at least one hardware processor, cause the at least one hardware processor to perform operations comprising:

receiving a request to generate computer code on behalf of a user;

in response to the receiving, identifying a first file currently being edited by the user in an editor;

transmitting, to a language server that is separate from a large language model (LLM), an identification of the first file along with a command to parse the first file, using a parser generator tool, to identify one or more artifacts in the first file;

receiving, from the language server, a list of the one or more artifacts identified by the language server;

transmitting, to the language server, a command to locate one or more code snippets, stored in a code repository, at one or more locations where at least one of the identified one or more artifacts is declared, defined, or referenced, wherein at least one of the one or more code snippets is contained in a file within the code repository that is currently closed in the editor;

receiving, from the language server, identifications of the one or more code snippets at the one or more locations where at least one of the identified one or more artifacts is declared, defined, or referenced;

generating a prompt to the large language model (LLM), the prompt including contents of the one or more code snippets and instructions to generate code using the contents of the one or more code snippets as context;

sending the prompt to the LLM; and receiving compilable generated code from the LLM.

2. The system of claim 1, wherein the receiving a request includes receiving a directive from a graphical user interface currently being interacted with by the user, the directive generated based on an explicit request from the user.

3. The system of claim 1, wherein the receiving a request includes receiving a directive from a graphical user interface currently being interacted with by the user, the directive generated without an explicit request from the user.

4. The system of claim 1, wherein the operations further comprise, in response to the receiving of the request:

identifying contextual information about the editing of the first file; and wherein the transmitting, to the language server, the identification of the first file further includes transmitting, to the language server, the contextual information about the editing of the first file.

5. The system of claim 4, wherein the contextual information includes a location of a cursor within the first file, as displayed a graphical user interface operated by the user.

6. The system of claim 4, wherein the identifications of the one or more code snippets at the one or more locations where at least one of the identified one or more artifacts is declared, defined, or referenced are limited to identifications of code snippets identified based on the contextual information.

7. The system of claim 1, wherein at least one of the one or more code snippets are contained in a file that is currently closed.

8. A method comprising:

receiving a request to generate computer code on behalf of a user;

in response to the receiving, identifying a first file currently being edited by the user in an editor;

transmitting, to a language server that is separate from a large language model (LLM), an identification of the first file along with a command to parse the first file, using a parser generator tool, to identify one or more artifacts in the first file;

receiving, from the language server, a list of the one or more artifacts identified by the language server;

transmitting, to the language server, a command to locate one or more code snippets, stored in a code repository, at one or more locations where at least one of the identified one or more artifacts is declared, defined, or referenced, wherein at least one of the one or more code snippets is contained in a file within the code repository that is currently closed in the editor;

receiving, from the language server, identifications of the one or more code snippets at the one or more locations where at least one of the identified one or more artifacts is declared, defined, or referenced;

generating a prompt to the large language model (LLM), the prompt including contents of the one or more code snippets and instructions to generate code using the contents of the one or more code snippets as context;

sending the prompt to the LLM; and receiving compilable generated code from the LLM.

9. The method of claim 8, wherein the receiving a request includes receiving a directive from a graphical user interface currently being interacted with by the user, the directive generated based on an explicit request from the user.

10. The method of claim 8, wherein the receiving a request includes receiving a directive from a graphical user interface currently being interacted with by the user, the directive generated without an explicit request from the user.

11. The method of claim 8, further comprising, in response to the receiving of the request:

identifying contextual information about the editing of the first file; and wherein the transmitting, to the language server, the identification of the first file further includes transmitting, to the language server, the contextual information about the editing of the first file.

12. The method of claim 11, wherein the contextual information includes a location of a cursor within the first file, as displayed a graphical user interface operated by the user.

13. The method of claim 12, wherein the identifications of the one or more code snippets at the one or more locations where at least one of the identified one or more artifacts is declared, defined, or referenced are limited to identifications of code snippets identified based on the contextual information.

14. The method of claim 8, wherein at least one of the one or more code snippets are contained in a file that is currently closed.

15. A non-transitory machine-readable medium storing instructions which, when executed by one or more processors, cause the one or more processors to perform operations comprising:

receiving a request to generate computer code on behalf of a user;

in response to the receiving, identifying a first file currently being edited by the user in an editor;

transmitting, to a language server that is separate from a large language model (LLM), an identification of the first file along with a command to parse the first file, using a parser generator tool, to identify one or more artifacts in the first file;

receiving, from the language server, a list of the one or more artifacts identified by the language server;

transmitting, to the language server, a command to locate one or more code snippets, stored in a code repository, at one or more locations where at least one of the identified one or more, artifacts is declared, defined, or referenced, wherein at least one of the one or more code snippets is contained in a file within the code repository that is currently closed in the editor;

receiving, from the language server, identifications of the one or more code snippets at the one or more locations where at least one of the identified one or more artifacts is declared, defined, or referenced;

generating a prompt to the large language model (LLM), the prompt including contents of the one or more code snippets and instructions to generate code using the contents of the one or more code snippets as context;

sending the prompt to the LLM; and receiving compilable generated code from the LLM.

16. The non-transitory machine-readable medium of claim 15, wherein the receiving a request includes receiving a directive from a graphical user interface currently being interacted with by the user, the directive generated based on an explicit request from the user.

17. The non-transitory machine-readable medium of claim 15, wherein the receiving a request includes receiving a directive from a graphical user interface currently being interacted with by the user, the directive and generated without an explicit request from the user.

18. The non-transitory machine-readable medium of claim 15, wherein the operations further comprise, in response to the receiving of the request:

identifying contextual information about the editing of the first file; and wherein the transmitting, to the language server, the identification of the first file further includes transmitting, to the language server, the contextual information about the editing of the first file.

19. The non-transitory machine-readable medium of claim 18, wherein the contextual information includes a location of a cursor within the first file, as displayed a graphical user interface operated by the user.

20. The non-transitory machine-readable medium of claim 19, wherein the identifications of the one or more code snippets at the one or more locations where at least one of the identified one or more artifacts is declared, defined, or referenced are limited to identifications of code snippets identified based on the contextual information.

* * * * *